(12) United States Patent
Jung

(10) Patent No.: US 7,987,792 B2
(45) Date of Patent: Aug. 2, 2011

(54) GAS GENERATOR

(75) Inventor: Christian Jung, Muehldorf (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 238 days.

(21) Appl. No.: 12/387,790

(22) Filed: May 7, 2009

(65) Prior Publication Data

US 2010/0031843 A1 Feb. 11, 2010

(30) Foreign Application Priority Data

May 8, 2008 (DE) .......................... 10 2008 022 755

(51) Int. Cl.
*C06D 5/00* (2006.01)

(52) U.S. Cl. ........ 102/530; 102/531; 102/200; 102/205; 102/202.5; 102/202.14; 280/728.1; 280/730.1; 89/1.14

(58) Field of Classification Search .......... 102/530–531, 102/202.5, 202.9, 202.12, 202.14, 205, 200; 280/728.1, 730.1–730.2, 733, 741; 89/1.14
See application file for complete search history.

(56) References Cited

U.S. PATENT DOCUMENTS

| | | | | |
|---|---|---|---|---|
| 5,531,473 A | * | 7/1996 | Rink et al. | 280/737 |
| 5,762,369 A | * | 6/1998 | Mooney et al. | 280/741 |
| 5,941,562 A | * | 8/1999 | Rink et al. | 280/737 |
| 6,098,548 A | * | 8/2000 | Rink et al. | 102/531 |
| 6,117,254 A | * | 9/2000 | Rink et al. | 149/35 |
| 6,221,186 B1 | * | 4/2001 | Rink et al. | 149/1 |
| 6,634,302 B1 | * | 10/2003 | Rink et al. | 102/530 |
| 6,877,436 B2 | * | 4/2005 | Jung et al. | 102/530 |
| 7,134,689 B2 | * | 11/2006 | Matsuda et al. | 280/736 |
| 7,350,819 B2 | * | 4/2008 | Stevens et al. | 280/806 |
| 7,380,820 B2 | * | 6/2008 | O'Loughlin et al. | 280/736 |
| 7,703,395 B2 | * | 4/2010 | Cook et al. | 102/530 |
| 7,828,324 B2 | * | 11/2010 | Herget et al. | 280/737 |
| 2005/0146123 A1 | * | 7/2005 | Bergmann et al. | 280/741 |
| 2010/0269726 A1 | * | 10/2010 | Jung et al. | 102/530 |

* cited by examiner

*Primary Examiner* — Bret Hayes
*Assistant Examiner* — Michael D David
(74) *Attorney, Agent, or Firm* — Tarolli, Sundheim, Covell & Tummino LLP

(57) ABSTRACT

A gas generator has an igniter and a compressed gas container which contains a first filling gas and has an outflow opening that is closed by a first bursting diaphragm. Upon activation of the gas generator the igniter produces a shock wave which runs at least in part through the compressed gas container before destroying the first bursting diaphragm. The compressed gas container is filled with a mixture of the first filling gas and at least one second substance having a molar mass higher than that of helium, the proportion of the second substance being between 1 and 13 mole percent of the total filling quantity or reaching, at maximum, the total mass of the first filling gas, and the first filling gas being helium, hydrogen, or a mixture of the two gases.

16 Claims, 1 Drawing Sheet

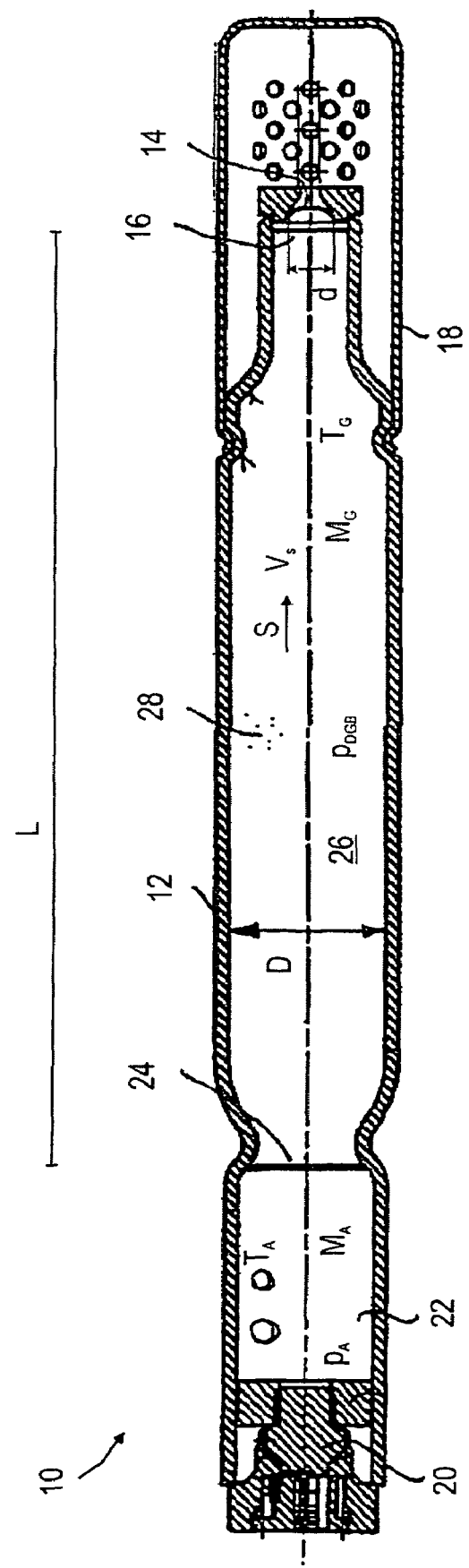
Fig.

GAS GENERATOR

FIELD OF THE INVENTION

The present invention relates to a gas generator.

BACKGROUND OF THE INVENTION

Gas generators are known that include an igniter and a compressed gas container which contains a first filling gas and has an outflow opening that is closed by a bursting diaphragm, where the igniter produces a shock wave upon activation of the gas generator and the shock wave runs at least in part through the compressed gas container before destroying the bursting diaphragm.

Following the destruction of the bursting diaphragm, the first filling gas and also the gas generated from the propellant charge associated with the igniter upon ignition thereof escape from the gas generator through the outflow opening to fill a gas bag or to drive a mechanical device such as a belt tensioner, for example.

In principle, there exist two different approaches to cause the bursting diaphragm to be opened due to the internal pressure of the compressed gas container. In the first case, the internal pressure within the entire compressed gas container is raised relatively homogeneously and relatively slowly by an increase in temperature until the internal pressure exceeds the bursting pressure of the bursting diaphragm. In the second case, a shock wave is produced, e.g., by the igniter, the shock wave running through the compressed gas container and impinging on the bursting diaphragm. In this case, the pressure at the bursting diaphragm is raised above the bursting pressure only locally and momentarily, whereas a distinctly lower pressure prevails in the remaining part of the compressed gas container. The advantage of the shock wave technique resides in that a rapid opening of the bursting diaphragm is obtained since the shock wave reaches the bursting diaphragm very fast.

An impulse transmitted by a shock wave is the higher the heavier the particles of the substance that is traversed by the shock wave. The velocity of flow of the gas out of the gas generator, however, is the higher the lighter the filling gas.

BRIEF SUMMARY OF THE INVENTION

It is an object of the invention to solve this inherent problem. To achieve this object, a gas generator has an igniter and a compressed gas container which contains a first filling gas and has an outflow opening that is closed by a first bursting diaphragm. Upon activation of the gas generator the igniter produces a shock wave which runs at least in part through the compressed gas container before destroying the first bursting diaphragm. The compressed gas container is filled with a mixture of the first filling gas and at least one second substance having a molar mass higher than that of helium, the proportion of the second substance being between 1 and 13 mole percent of the total filling quantity or reaching, at maximum, the total mass of the first filling gas, and the first filling gas being helium, hydrogen, or a mixture of the two gases. It has been found that even this small admixture of heavier substances causes the bursting diaphragm to reliably open while the rapid outflow characteristic is maintained.

In a preferred embodiment, the second substance is a gas. This has the advantage of ease of handling. In addition, a large variety of gases are available that are suitable for this purpose. The proportion of the total filling quantity is then determined to advantage by the molar ratio of from 1 to 13 mole percent.

The second substance may be, e.g., argon, neon, nitrogen, carbon dioxide, sulfur hexafluoride, oxygen, dinitrogen oxide, or a mixture of at least two of these gases. Especially when helium is used as an inert gas, there are no concerns with regard to a chemical reaction between the first filling gas and the second substance.

In a further embodiment of the invention, the second substance consists of ultra-small particles (e.g., nano- or microparticles). That is, a solid in powder form is used here, having grain sizes in the range of preferably a maximum of 10 μm. In this case, too, an increase in the impulse of the shock wave is produced owing to the higher mass of the nanoparticles, so that the diaphragm is effectively opened.

The ultra-small particles may be provided in the form of an aerogel powder, for example. This material is simple to manufacture with the desired grain sizes and, e.g. in a gas bag, does not lead to an impairment of function.

Preferably, in this case the total mass of the ultra-small particles is smaller than the total mass of the first filling gas.

The second substance is always only a minor admixture in terms of volume, which is intended to influence the opening behavior of the bursting diaphragm, but not the outflow behavior of the gas out of the gas generator.

In a preferred construction, the gas generator has an elongated outer housing and the igniter is arranged at a first axial end of the outer housing and the outflow opening is arranged at a second end of the outer housing. Gas generators according to the invention may be used both for front passenger gas bag modules and gas bag modules that are built into back rests or the side of a vehicle. Further areas of application are, of course, also conceivable.

On account of the ideal impulse transmission, particularly good results are obtained if the shock wave produced by the igniter runs perpendicularly to the bursting diaphragm.

The pressure inside the compressed gas container may amount to approx. 500 bar (at 20° C.) prior to activation of the gas generator.

The igniter is advantageously separated from the compressed gas container by a second bursting diaphragm, so that upon ignition of the gas generator, a predetermined pressure initially builds up in the igniter chamber, which is determined by the bursting pressure of this second bursting diaphragm. When the second bursting diaphragm, arranged on the igniter side, bursts, the abruptly occurring pressure differential causes the shock wave to be set off, which runs through the compressed gas container and to the second bursting diaphragm.

The shock wave velocity is preferably between 750 and 1250 m/s. The time period between the opening of the second bursting diaphragm on the igniter side and the first bursting diaphragm on the outflow opening side advantageously amounts to between 0.03 and 0.35 ms. This applies to gas generators having compressed gas chambers with a length of from 4 to 24 cm.

The inverse failure pressure of the second bursting diaphragm, i.e. the differential pressure on the igniter side at which the second bursting diaphragm is destroyed, is preferably between 0.75 $p_{DGB}$ and 1.25 $p_{DGB}$, where $p_{DGB}$ denotes the pressure in the compressed gas container. It has been found that at these values a sufficiently strong shock wave is generated if a standard igniter is used.

Preferably, the quantity $M_A * T_G / (M_G * T_A)$ is between 0.1 and 2, where $M_G$ is the molar mass of the first filling gas, $M_A$ is the molar mass of the gas generated by the igniter, $T_G$ is the temperature of the first filling gas, and $T_A$ is the temperature of the gas generated by the igniter. The temperature $T_G$ of the first filling gas relates to the condition immediately before or during ignition.

The ratio $M_G^{1/2}/d^2$ is preferably between 0.05 and 0.25, where $M_G$ is the molar mass of the first filling gas in g/mol and d is the smallest diameter of the outflow opening in the first diaphragm in mm. This ratio between the diameter of the out-flow opening and the quantity of the first filling gas in the compressed gas chamber allows the gas generator to be simply adjusted to its intended application. By appropriately varying the filling quantity and/or the diameter, the shock wave technology may be employed in gas generators of different dimensions. It has been found that in this way both a good opening of the bursting diaphragm and a sufficient amount of gas for the particular purpose of use can be achieved.

BRIEF DESCRIPTION OF THE DRAWING

The single FIGURE shows a diagrammatic cross-section through a gas generator according to the invention.

DETAILED DESCRIPTION OF A PREFERRED EMBODIMENT

The gas generator 10 illustrated in the FIGURE has an elongated cylindrical compressed gas container 12 which at one axial end includes an outflow opening 16 that is closed by a first bursting diaphragm 14. In the case of the first diaphragm 14, the outflow opening has a narrowest diameter d, which normally is smaller than the diameter D of the compressed gas container 12. In the case shown, the outflow opening 16 is covered by an optional diffusor 18 which provides for a distribution of the emerging gas.

The gas generator 10 as shown could be employed for filling a gas bag of a front passenger protective device, for example. The invention is however not limited to such gas generators, but may be made use of in any gas generator in which a shock wave is used for opening a bursting diaphragm.

An igniter 20 of known structure is provided at the axial end of the gas generator 10 opposite the first bursting diaphragm 14. A propellant charge arranged in the igniter 20 is ignited electrically from outside when it is intended to activate the gas generator 10. Provided between the igniter 20 and the compressed gas container 12 is an igniter chamber 22 which is distinctly smaller than the compressed gas container 12. The igniter chamber 22 is initially separated in a gas-tight manner from the compressed gas container 12 by a second bursting diaphragm 24.

Inside the compressed gas container 12 a quantity $M_G$ of a first filling gas 26 is received, which is hydrogen, helium, or a mixture of the two gases. Admixed to the first filling gas 26 is a small proportion of a second, heavier, substance 28 which more particularly has a higher molar mass than helium. The second substance 28 is indicated by dots in the FIGURE. The second substance 28 may be a gas, with gases having high molar masses being preferred, such as argon, neon, nitrogen, carbon dioxide, sulfur hexafluoride, oxygen, dinitrogen oxide, or a mixture of at least two of these gases. The admixture of the second substance 28 is then selected such that the proportion of the first filling gas 26 in the total filling quantity varies from 87 to 99 mole percent.

Alternatively, the second substance 28 may be ultra-small particles, in this case micro- or nanoparticles, i.e. a solid having a grain size of up to a maximum of approximately 10 µm. An aerogel powder may be used here, for example. In this case, the total weight of the admixed ultra-small particles corresponds, at maximum, to the total weight of the first filling gas 26. In this case, too, by far the major part of the filling of the compressed gas container 12 consists of the first filling gas 26 since the mass of a solid body is by far greater than that of a gas, in particular hydrogen or helium.

Prior to activation of the gas generator 10, the pressure $p_{DGB}$ prevailing in the compressed gas container 12 amounts to approximately 500 bar (at 20° C.).

Upon activation of the gas generator 10, the igniter 20 is ignited, whereupon its propellant charge and any further combustible material that may be present in the igniter chamber 22 will burn to generate hot gas having the mass $M_A$ and the temperature $T_A$. The temperature $T_A$ may be on the order of 2900 K, for example. The pressure $p_A$ inside the igniter chamber 22 rises in the process. The bursting pressure of the second bursting diaphragm 24 is between 0.75 $p_{DGB}$ and 1.25 $p_{DGB}$ here, which, at a pressure $p_{DGB}$ of 500 bar, results in a minimum value for $p_A$ of 875 to 1125 bar. Once this pressure is exceeded, the second bursting diaphragm 24 yields abruptly, so that the igniter chamber 22 is opened with respect to the compressed gas container 12. The destruction of the second bursting diaphragm 24 and the high pressure abruptly applied to the compressed gas container 12 result in the generation of a shock wave S, which runs in the axial direction A from the igniter chamber 22 through the compressed gas container 12 to the first bursting diaphragm 14, which here is located at the opposite axial end of the gas generator 10. Upon impingement on the first bursting diaphragm 14, the latter is destroyed due to the local increase in pressure caused by the shock wave since the bursting pressure of the first bursting diaphragm 14 is momentarily exceeded. Following the destruction of the first bursting diaphragm 14, both the gas contained in the compressed gas container 12, that is, the first filling gas 26 and the quantity of the second substance 28, and also the gas produced by the igniter 20 and present in the igniter chamber 22 flow out of the gas generator 10 into the surroundings thereof. It is not required here for the first filling gas 26 to have been considerably heated yet.

The higher mass of the particles of the second substance 28 increases the impulse of the shock wave S, so that for the first filling gas 26 a very light-weight gas, namely hydrogen or helium, may be made use of and, at the same time, the pressure differential between the pressure $p_A$ in the igniter chamber 22 and the pressure $p_{DGB}$ in the compressed gas container may be reduced without giving up the positive characteristics of the shock wave method.

The shock wave velocity $v_s$ is between 750 and 1250 m/s here. Accordingly, with a length L of the compressed gas container 12 of between approximately 4 and 24 cm, the time period between the opening of the second and first bursting diaphragms 24, 14 amounts to between 0.03 and 0.35 ms.

A suitable relation between the filling quantity of the gas generator 10 and the dimension of the igniter side is provided by the quantity $M_A*T_G/M_G*T_A$, which should be between 0.1 and 2, where $M_G$ is the molar mass of the first filling gas and $M_A$ is the molar mass of the gas generated by the igniter 20 (and any further propellant charge that may be contained in the igniter chamber 22), $T_G$ is the temperature of the first filling gas and $T_A$ is the temperature of the gas generated by the igniter.

The relation between the quantity $M_G$ of the first filling gas 26 and the smallest diameter d of the outflow opening 16 in the first bursting diaphragm 14 may be determined by means of the relation $M_G^{1/2}/d^2$, which should be in the range of from 0.05 to 0.25, where $M_G$ is the molar mass of the first filling gas 26 in g/mol and d is the narrowest diameter of the outflow opening 16 in the first bursting diaphragm 14 in mm.

In the example shown here, the shock wave S runs perpendicularly both to the first bursting diaphragm 14 and to the second bursting diaphragm 24. In the variant shown here, the first bursting diaphragm 14 and the second bursting diaphragm 24 are positioned directly opposite each other. It would, however, also be possible to use a design in which the shock wave S impinges on the first bursting diaphragm 14 at an angle. It would likewise be conceivable to divert the shock wave S appropriately.

The invention claimed is:

1. A gas generator comprising:
   an igniter and
   a compressed gas container containing a first filling gas and having an out-flow opening that is closed by a first bursting diaphragm,
   the igniter producing a shock wave upon activation of the gas generator, the shock wave running at least in part through the compressed gas container before destroying the first bursting diaphragm,
   the compressed gas container being filled with a mixture of the first filling gas and at least one second substance having a molar mass higher than that of helium, the proportion of the second substance being one of between 1 and 13 mole percent of the total filling quantity and reaching, at maximum, the total mass of the first filling gas,
   and the first filling gas being one of helium, hydrogen, and a mixture of the two gases.

2. The gas generator according to claim 1, wherein the second substance is a gas.

3. The gas generator according to claim 2, wherein the second substance is one of argon, neon, nitrogen, carbon dioxide, sulfur hexafluoride, oxygen, dinitrogen oxide, and a mixture of at least two of these gases.

4. The gas generator according to claim 1, wherein the second substance consists of ultra-small particles.

5. The gas generator according to claim 4, wherein the second substance is an aerogel powder.

6. The gas generator according to claim 4, wherein in that the mass of the ultra-small particles is smaller than the mass of the first filling gas.

7. The gas generator according to claim 1, wherein the gas generator has an elongated outer housing, the igniter being arranged at a first axial end of the outer housing and the outflow opening being arranged at a second end of the outer housing.

8. The gas generator according to claim 7, wherein the shock wave produced by the igniter runs perpendicularly to the first bursting diaphragm.

9. The gas generator according to claim 1, wherein prior to activation of the gas generator, the pressure inside the compressed gas container amounts to approx. 500 bar at 20° C.

10. The gas generator according to claim 1, wherein the igniter is separated from the compressed gas container by a second bursting diaphragm.

11. The gas generator according to claim 10, wherein the igniter is located outside the compressed gas container and produces the shock wave by destroying the second bursting diaphragm.

12. The gas generator according to claim 1, wherein the shock wave velocity is between 750 and 1250 m/s.

13. The gas generator according to claim 1, wherein the time period between the opening of the second and first bursting diaphragms amounts to between 0.03 and 0.35 ms.

14. The gas generator according to claim 1, wherein the inverse failure pressure of the second bursting diaphragm is between $0.75\, p_{DGB}$ and $1.25\, p_{DGB}$, where $p_{DGB}$ denotes the pressure in the compressed gas container.

15. The gas generator according to claim 1, wherein the quantity $M_A * T_G / (M_G * T_A)$ is between 0.1 and 2, where $M_G$ is the molar mass of the first filling gas and $M_A$ is the molar mass of the gas generated by the igniter and $T_G$ is the temperature of the first filling gas and $T_A$ is the temperature of the gas generated by the igniter.

16. The gas generator according to claim 1, wherein the ratio $M_G^{1/2}/d^2$ is between 0.05 and 0.25, where $M_G$ is the molar mass of the first filling gas in g/mol and d is the smallest diameter of the outflow opening in the first bursting diaphragm (14) in millimeters.

* * * * *